United States Patent [19]

Kawakami

[11] Patent Number: 5,450,310

[45] Date of Patent: Sep. 12, 1995

[54] CONTROL SYSTEM FOR POWER CONVERTER WITH PREVENTION OF DC MAGNETIZATION IN THE TRANSFORMER

[75] Inventor: Noriko Kawakami, Tokyo, Japan

[73] Assignee: Kabushiki Kaisha Toshiba, Kawasaki, Japan

[21] Appl. No.: 274,454

[22] Filed: Jul. 13, 1994

[30] Foreign Application Priority Data

Jul. 13, 1993 [JP] Japan .................. 5-172766

[51] Int. Cl.⁶ .............................................. H02M 3/24
[52] U.S. Cl. ........................................... 363/96; 363/27
[58] Field of Search ................. 363/27, 28, 57, 58, 363/64, 96, 128, 130, 135, 136; 323/205, 207, 356, 358

[56] References Cited

U.S. PATENT DOCUMENTS

| | | | |
|---|---|---|---|
| 3,667,027 | 5/1972 | Martin | 321/11 |
| 4,173,779 | 11/1979 | Abbondanti et al. | 363/135 |
| 4,611,267 | 9/1986 | McMurray | 363/27 |
| 5,001,619 | 3/1991 | Nakajima et al. | 363/41 |
| 5,177,428 | 1/1993 | Hirobe et al. | 363/96 |

FOREIGN PATENT DOCUMENTS

| | | | |
|---|---|---|---|
| 0361389 | 4/1990 | European Pat. Off. | H02M 7/48 |
| 4013171 | 10/1990 | Germany | H02M 7/48 |
| 62-207173 | 9/1987 | Japan | H02M 7/48 |
| 2-307374 | 12/1990 | Japan | H02M 7/537 |
| 3-139175 | 6/1991 | Japan | H02M 7/48 |
| 4-4756 | 1/1992 | Japan | H02M 7/48 |
| 4-322170 | 11/1992 | Japan | H02M 7/48 |
| 5-236761 | 9/1993 | Japan | H02M 7/515 |

Primary Examiner—Thomas M. Dougherty
Assistant Examiner—Matthew V. Nguyen
Attorney, Agent, or Firm—Oblon, Spivak, McClelland, Maier & Neustadt

[57] ABSTRACT

A control system for a power converter which is composed of a plurality of self-turn-off devices and is connected to an outer system through a transformer provided with a core. The control system includes an output voltage instruction value generating circuit for generating an instruction value for an output voltage of the power converter. The control system also includes a correction circuit for correcting the instruction value based on a magnetic flux relating value of the core of the transformer to generate a corrected instruction value for the output voltage of the power converter. The control system further includes a gate pulse generating circuit for generating a gate pulse based on the corrected instruction value. The gate pulse is applied to the self-turn-off devices of the power converter to control the output voltage of the power converter. Whereby DC magnetization of the transformer is suppressed even for the case when DC component is generated by the outer system.

10 Claims, 5 Drawing Sheets

CONTROL SYSTEM FOR POWER CONVERTER WITH PREVENTION OF DC MAGNETIZATION IN THE TRANSFORMER

BACKGROUND OF THE INVENTION

1. Field of the Invention

This invention relates to a control system for a power converter, and more particularly relates to a control system for a power converter which is composed of self-turn-off devices such as, gate turn-off thyristors (hereafter, simply GTOs), and is connected to a power system or loads via transformers, which can prevent DC magnetization of the transformer.

2. Description of the Related Art

Figure 7:
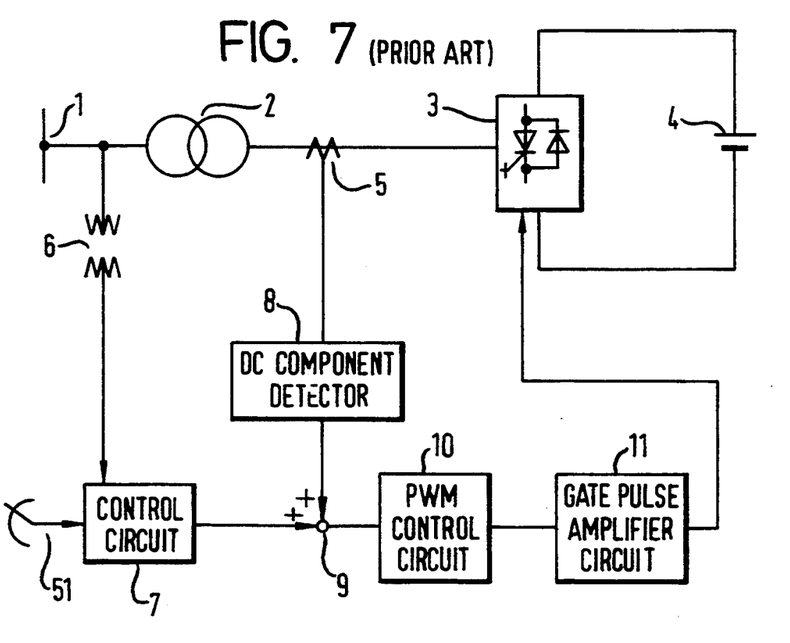
FIG. 7 is a schematic block diagram of showing a prior art control system for a power converter.

FIG. 7 shows a schematic diagram of a prior art control system for a power converter which is composed of GTOs (hereafter, called a self-commutated converter), and is used in a DC transmission system or a static vat compensator and so on.

In FIG. 7:

1 is a power system;

2 is a transformer for connecting a self-commutated converter 3 composed of GTOs and power system 1;

4 is a DC power source such as capacitors etc.;

5 is a current detector which measures the output current of self-commutated converter 3;

6 is a potential transformer which measures the voltage of power system 1;

7 is a control circuit which controls the system voltage according to a system voltage reference 51;

8 is a DC component detector which detects the DC component contained in the output current of self-commutated converter 3 measured by current detector 5;

9 is an adder which adds the output of control circuit 7 which is an instruction value for the output voltage of self-commutated converter 3, and the output of DC component detector 8;

10 is a pulse-width modulation (PWM) control circuit which adjusts the output voltage of self-commutated converter 3 by determining the firing timing of the GTOs in response to the output of adder 9; and 11 is a gate pulse amplifier circuit for generating gate pulses for GTOs in self-commutated converter 3.

In FIG. 7, PWM control circuit 10 determines the GTO firing pattern so that no DC component is contained in the output voltage of self-commutated converter 3. However, the actual output voltage takes a waveform which contains a DC component due to the variations in the characteristic of the GTO and the variations in the gate signal transmission time.

When the output voltage of self-commutated converter 3 contains a DC component, the core of transformer 2 is magnetized asymmetrically because the voltage time product per cycle applied to transformer 2 does not become "0". Thus, the excitation current increases, and the output current of self-commutated converter 3 becomes over-current. This leads the stop of operation of self-commutated converter 3 for protection thereof. In the worst case, this sometimes leads to damage to the devices which compose self-commutated converter 3. In the prior art circuit shown in FIG. 7, to prevent DC magnetization the following control is performed. That is, the output current of self-commutated converter 3 is detected by current detector 5 and the DC component generated in the course of DC magnetization is detected by DC component detector 8. PWM control is then executed by adding the detected DC component and the instruction value from control circuit 7. Therefore, the output voltage of self-commutated converter 3 is adjusted so that DC magnetization is eliminated.

The voltage of power system 1 is usually AC voltage. However, transient DC components may be included in the voltage of power system 1 such as when connecting the power capacitor or the transformer to power system 1. In prior art technology, while it is possible to correct the DC component outputted from self-commutated converter 3, the DC magnetization due to the DC component generated by power system 1 cannot be suppressed, because no correction due to the DC component of power system 1 side is made. Therefore, when a transient DC component is generated in power system 1, transformer 2 will be magnetized asymmetrically and lead to an over-current.

SUMMARY OF THE INVENTION

Accordingly, one object of this invention is to provide a control system for a power converter which can suppress DC magnetization of the transformer even for the DC component generated by the power system side.

These and other objects of this invention can be achieved by providing a control system for a power converter which is composed of a plurality of self-turn-off devices and is connected to an outer system through a transformer provided with a core. The control system includes an output voltage instruction value generating circuit for generating an instruction value for an output voltage of the power converter. The control system also includes a correction circuit for correcting the instruction value based on a magnetic flux relating value of the core of the transformer to generate a corrected instruction value for the output voltage of the power converter. The control system further includes a gate pulse generating circuit for generating a gate pulse based on the corrected instruction value. The gate pulse is applied to the self-turn-off devices of the power converter to control the output voltage of the power converter. Whereby DC magnetization of the transformer is suppressed even for the case when DC component is generated by the outer system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views, the embodiments of this invention will be described below.

Figure 1:
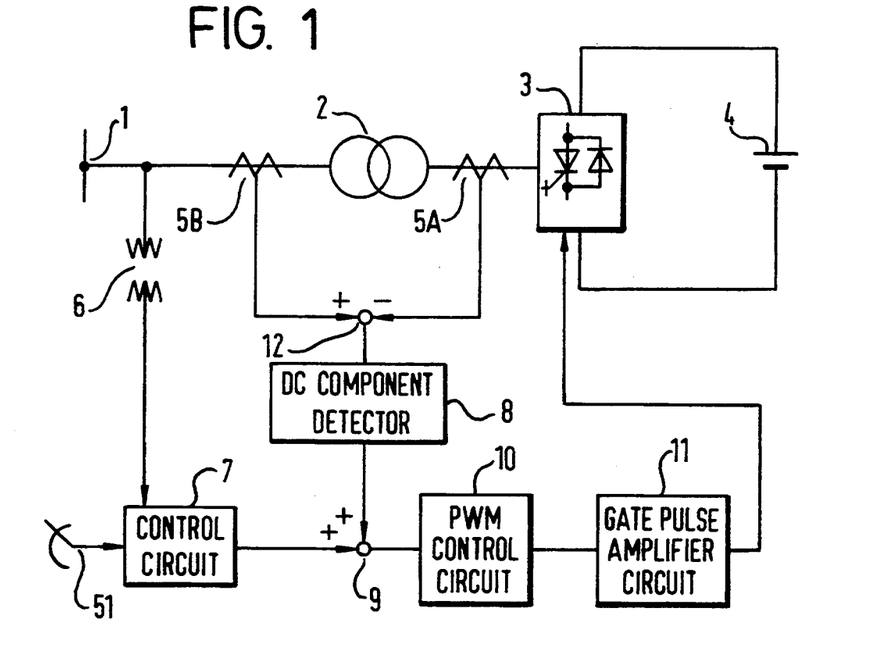
FIG. 1 is a schematic block diagram showing a control system for a power converter according to an embodiment of this invention.

FIG. 1 is a schematic diagram of a control system for a power converter according to an embodiment of this invention.

In FIG. 1, 5B is a current detector which detects the current on the primary winding side of transformer 2. 12 is a subtractor for finding the difference between the transformer secondary winding current detected by a current detector 5A and the transformer primary winding current detected by current detector 5B.

Figure 2:
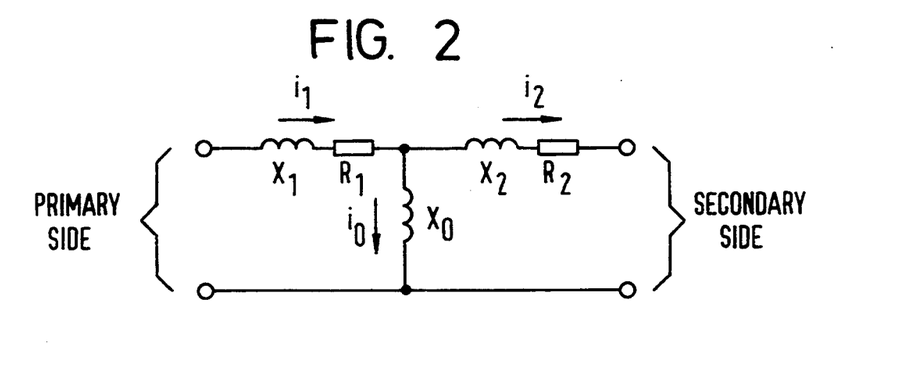
FIG. 2 is a simplified equivalent circuit of the transformer 2 shown in FIG. 1.

FIG. 2 shows a general equivalent circuit for transformer 2. In FIG. 2, X1 and X2 are leakage inductances of transformer 2; R1 and R2 are copper losses of transformer 2; X0 is an excitation inductance of transformer 2; and i1, i2 and i0 are respectively, a primary current, a secondary current and an excitation current flowing in transformer 2. As can be seen from the equivalent circuit in FIG. 2, if, for simplicity, the winding ratio of transformer 2 is taken as 1, excitation current i0 of transformer 2 is equal to the difference between primary current i1 and secondary current i2. Excitation current i0 almost corresponds to the magnetic flux of the core of transformer 2. Therefore, if a DC component included in excitation current i0 is detected, the value of DC magnetization can be estimated. Accordingly, in the embodiment shown in FIG. 1, the difference between the primary winding current and the secondary winding current of transformer 2 is computed by subtractor 12. A DC component in the current difference is detected by DC component detector 8. Then the output voltage instruction value from control circuit 7 is corrected by the DC component thus detected so that the DC magnetization is eliminated. As a result, the DC magnetization of transformer 2 can be suppressed. Also, since the correction is made by the excitation current, both DC magnetization due to the DC component included in the output of self-commutated converter 3 and the DC magnetization due to the transient DC component included in power system 1 can be corrected.

Figure 1A:
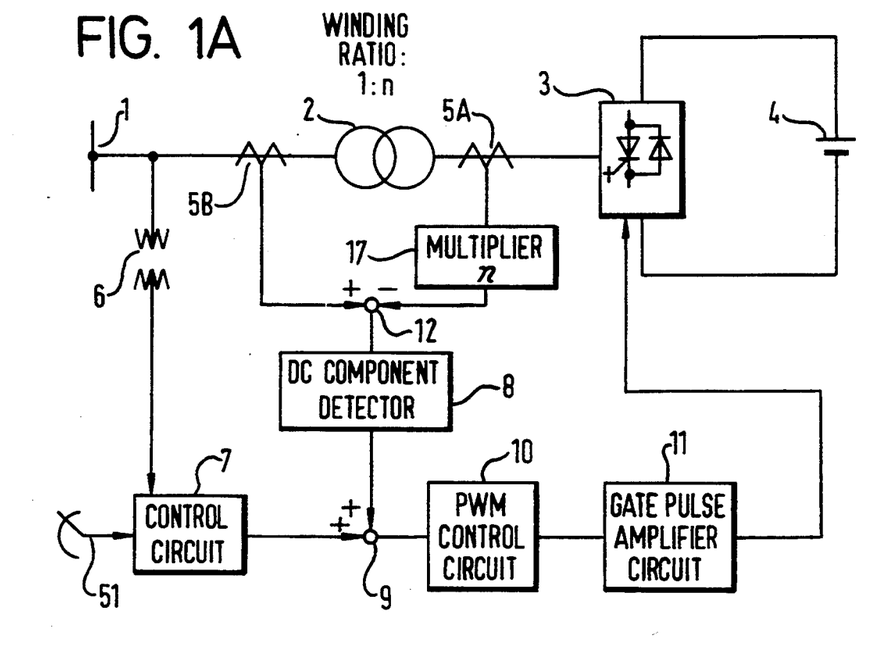
FIG. 1A is a schematic block diagram showing a control system for a power converter according to another embodiment of this invention.

FIG. 1 shows the embodiemnt wherein the winding ratio of transformer 2 is taken as 1. This invention is not limited to this embodiment. FIG. 1A shows a control system for a power converter according to another embodiment of this invention wherein the winding ratio of transformer 2 is 1: n. In FIG. 1A, 17 is a multiplier which multiplies the secondary winding current of transformer 2 detected by current detector 5A by n. The output of multiplier 17 is applied to subtractor 12, which finds the difference between the transformer primary current and the output of multiplier 17. The following control is executed the same as in the embodiment shown in FIG. 1.

In case that the winding ratio of transformer 2 is 1:n, the magnitude of the secondary winding current of transformer 2 is 1/n times that of the primary winding current of transformer 2. In order to calculate the excitation current based on the primary and secondary winding currents of transformer 2, it is necessary to multiply the secondary winding current by n. Multiplier 17 is provided for this purpose.

Instead of providing multiplier 17 in FIG. 1A, a divider may be provided between current detector 5B and subtractor 12 which divides the primary winding current of transformer 2 detected by current detector 5B by n.

Figure 1B:
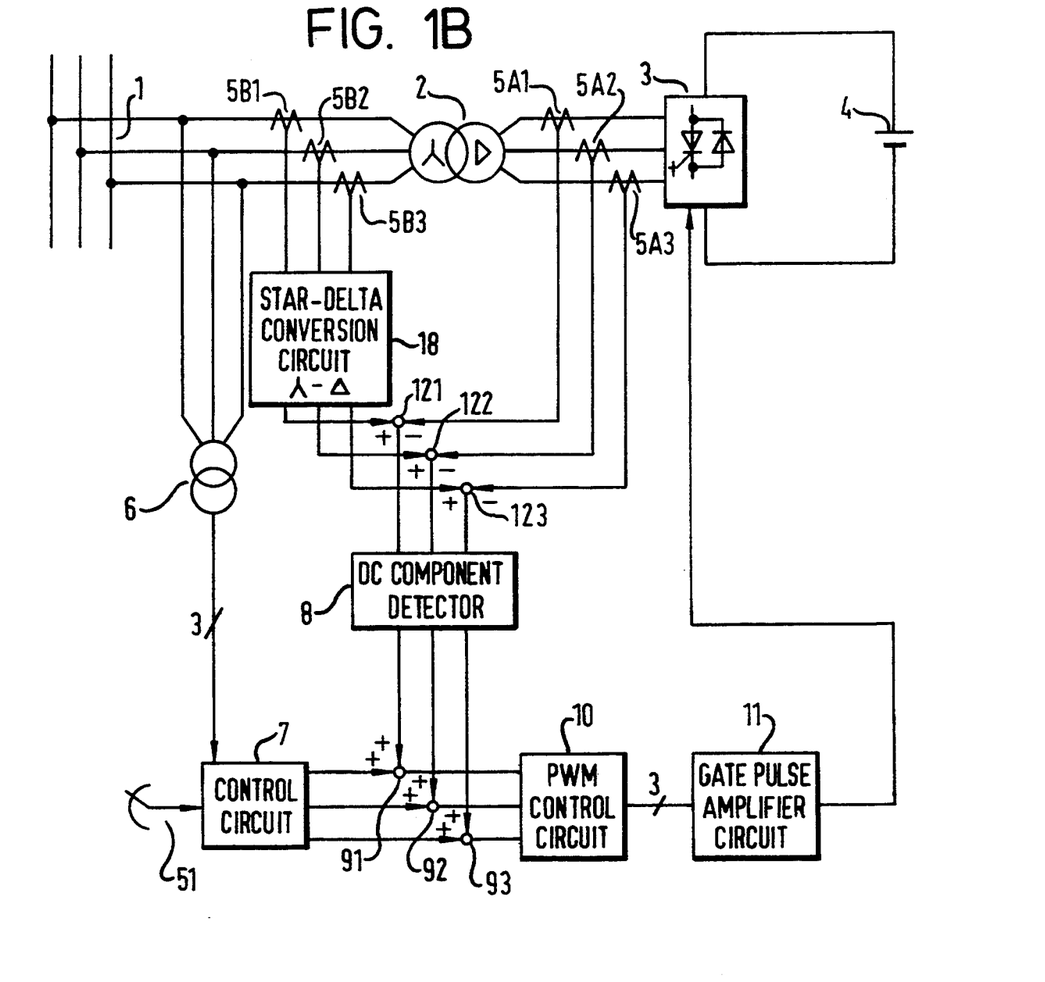
FIG. 1B is a schematic block diagram showing a control system for a power converter according to a further embodiment of this invention.

FIG. 1B shows a control system for a power converter according to a further embodiment of this invention wherein power converter 3 is a three-phase power converter. In this case, transformer 2 is composed of a star-delta connection. In FIG. 1B, 5A1, 5A2 and 5A3 are current detectors for detecting the currents on the secondary windings of transformer 2, respectively. 5B1, 5B2 and 5B3 are current detectors for detecting the currents on the primary windings of transformer 2, respectively. As the type of the connection of the primary winding differs from that of the secondary winding in transformer 2, the phase of the primary winding current is different from that of the secondary winding current, so that it is necessary to convert the phase of the detected current. A star-delta conversion circuit 18 is provided for this purpose. The primary winding currents detected by current transformers 5B1, 5B2 and 5B3 are applied to star-delta conversion circuit 18. 121, 122 and 123 are subtractors for finding the differences between the three outputs of star-delta conversion circuit 18 and the secondary winding currents detected by current transformers 5A1, 5A2 and 5A3, respectively. DC component detector 8 detects the DC components contained in the outputs of subtractors 121, 122 and 123 and applies them to adders 91, 92 and 93, respectively. Adders 91, 92 and 93 add the three phase components of the output of control circuit 7 and the three outputs of DC component detector 8, respectively and apply the respective sums to PWM control circuit 10.

Instead of providing star-delta conversion circuit 18 in the primary side as shown in FIG. 1B, a delta-star conversion circuit may be provided between current transformers 5A1, 5A2 and 5A3 in the secondary side and subtractors 121, 122 and 123.

In these embodiments, circuit elements, such as multiplier 17 and star-delta conversion circuit 18, are well known to those skilled in the art. Accordingly, the detailed description of the circuit construction of these circuit elements may be omitted.

As described above, according to these embodiments, in a power converter composed of self-turn-off devices and connected to an outer system, such as a power system or a load, via a transformer, both the DC magnetization due to the DC components included in the output of the power converter and the DC magnetization due to the transient DC component included in the outer system can be corrected by:

finding the difference between the primary winding current and the secondary winding current of the transformer;

detecting the DC component included in this difference; and correcting the output voltage instruction value of the power converter based on this DC component as one of the magnetic flux relating values of transformer 2.

Furthermore, the case is considered in which a current including DC component is flowing from power system 1 to self-commutated converter 3. In this case, the DC component of the primary winding current detected by current detector 5B is equal to that of the secondary winding current detected by current detector 5A is FIG. 1, and no DC magnetization of transformer 2 occurs. Accordingly, the output of DC component detector 8 is zero, so that no correction to the instruction value outputted from control circuit 1 is executed.

But in the prior art control system shown in FIG. 7, only the secondary winding current of transformer 2 is detected by current transformer 5. As the DC component is included in the detected current, correction is erroneously made to the instruction value from control circuit 7 by the DC component from DC component detector 8, even though the DC component of the excitation current is zero and DC magnetization of transformer 2 does not occur. In such a case, this embodiment has the merit that an erroneous correction can be avoided.

Figure 3:
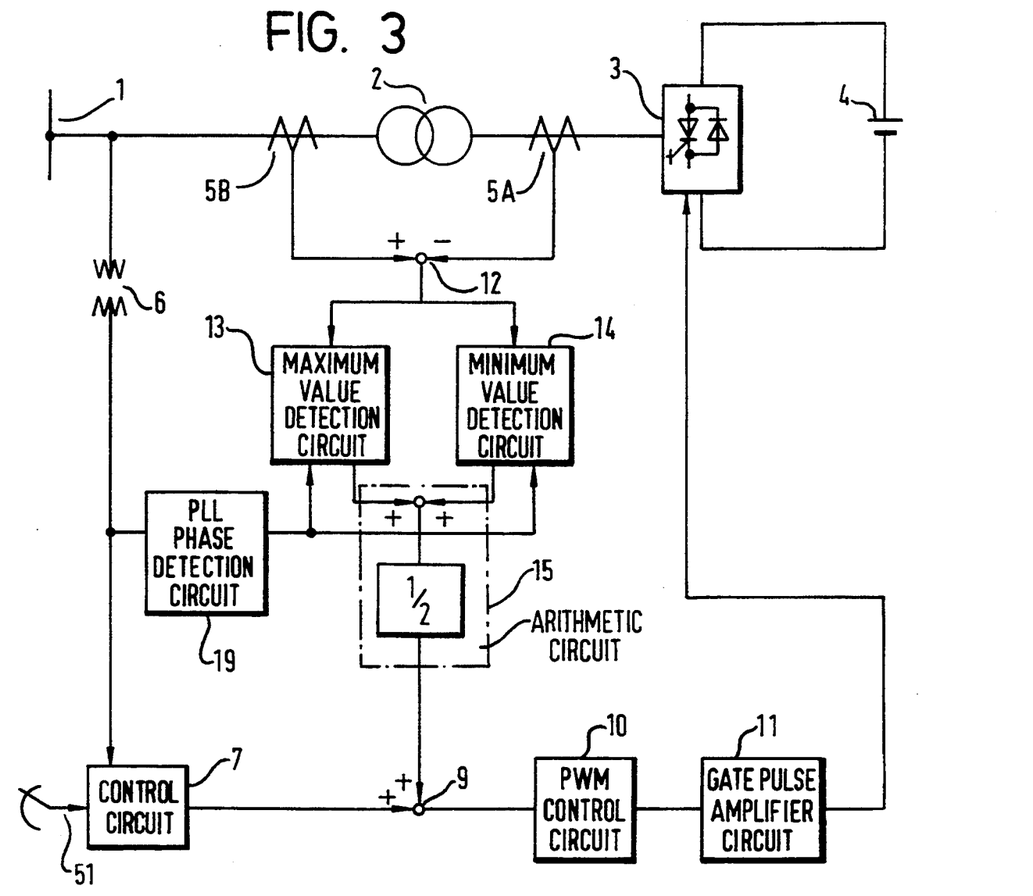
FIG. 3 is a schematic block diagram showing a control system for a power converter according to another embodiment of this invention.

The following is a description of another embodiment of this invention with reference to the schematic diagram in FIG. 3.

In FIG. 3, 19 is a phase detection circuit, such as a phase locked loop circuit, which outputs a signal at every fundamental period of power system 1. This signal is applied to a maximum value detection circuit 13 and a minimum value detection circuit 14. The current difference between the transformer primary current and secondary current computed by subtractor 12 is also applied to maximum value detection circuit 13 and minimum value detection circuit 14. Maximum value detection circuit 13 and minimum value detection circuit 14 detect the maximum and the minimum values of the current difference at every fundamental period of power system 1, respectively. 15 is an arithmetic circuit which computes the center value of the current difference at every fundamental period of power system 1 from the maximum and minimum values. The center value is applied to adder 9.

Figure 4A:
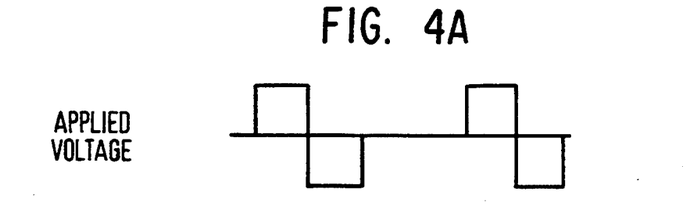
FIG. 4 is a diagram showing the relationship between magnetic flux and excitation current when an irregular AC voltage is applied.
Figure 4B:
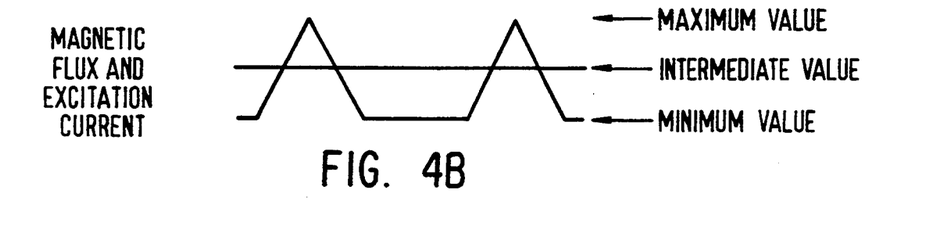

When this embodiment is composed in this way, as shown in FIG. 4(a), even when a period occurs in which constant values continue for both magnetic flux and excitation current due to the application of an irregular AC voltage, the DC magnetization can be more accurately grasped by detecting the center value of the magnetic flux as one of magnetic flux relating values. Also, the effect of being able to correct both the DC magnetization due to the DC component included in the output of self-commutated converter 3 and the DC magnetization due to the transient DC component included in power system 1 can be obtained.

Figure 5:
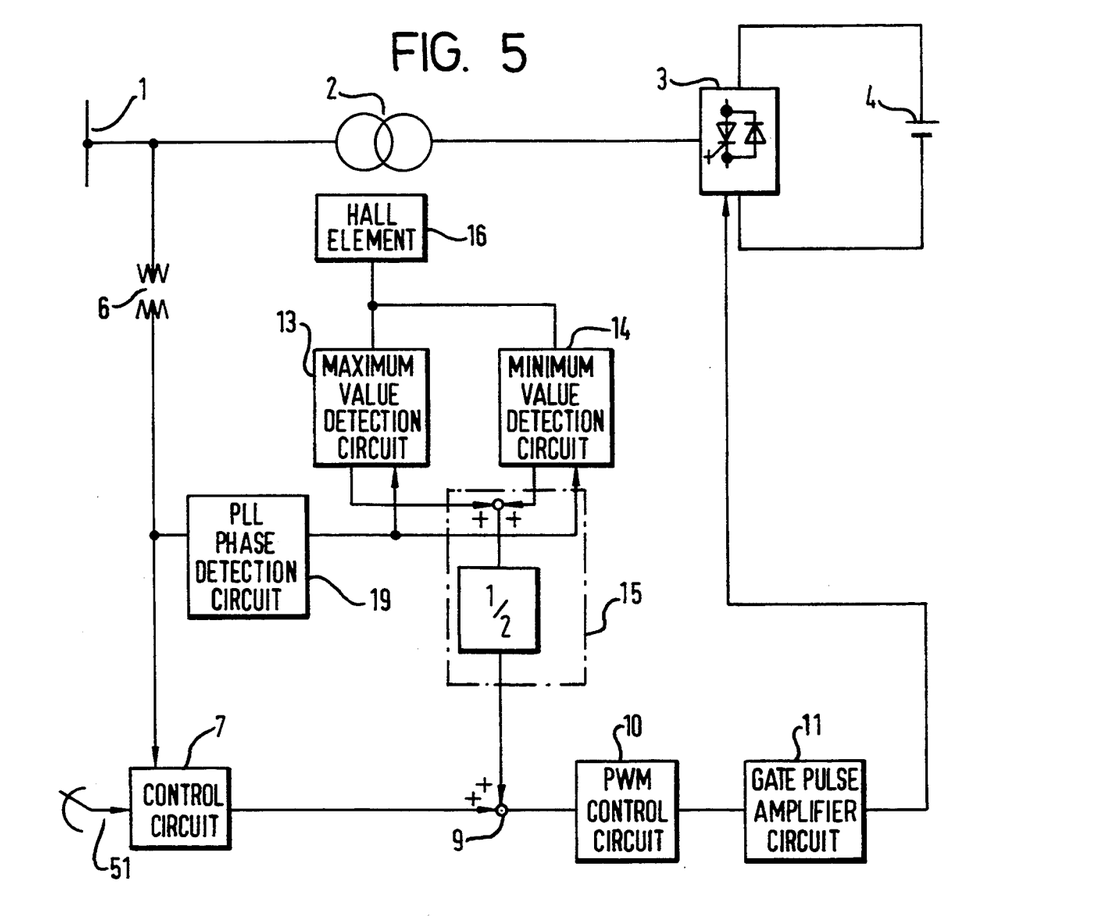
FIG. 5 is a schematic block diagram showing a control system for a power converter according to a further embodiment of this invention.

The following is a description of a further embodiment of this invention with reference to the schematic diagram in FIG. 5. In FIG. 5, 16 is a magnetic detector, such as a Hall element, for detecting the magnetic flux of the core of transformer 2.

Figure 6:
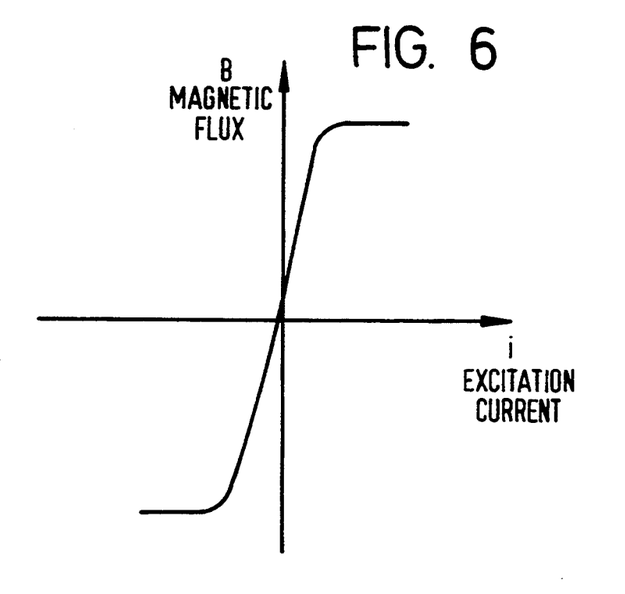
FIG. 6 is a diagram showing the relationship between the excitation current and the magnetic flux in the transformer core.

In FIG. 5, the output voltage instruction of control circuit 7 is corrected using the value of magnetic flux of the core of transformer 2, instead of the current difference between the transformer primary winding current and the transformer secondary winding current in FIG. 3. The following control is executed the same as in the embodiment shown in FIG. 3. As shown in FIG. 6, the relationship between excitation current and magnetic flux in transformer 2 is non-linear. The excitation current only gradually increases until the core of transformer 2 reaches saturation. However, when the core reaches saturation, it increases rapidly. Therefore, in order to suppress DC magnetization by correcting before saturation is reached, the detection of a DC component of a small excitation current or its variation is required. In order to detect such a small variation, the detection of the excitation current must be highly accurate. However, usually, the magnitude of the excitation current is less than 10% of that of the rated current of a transformer. Therefore, when detecting the excitation current by the difference between the primary winding current and the secondary winding current, a current detector with an accuracy of 0.1% is required in the case of detecting with an accuracy of 1% an excitation current the magnitude of which is 10% that of the rated current.

When correcting the output voltage instruction value by detecting the magnetic flux of the transformer core as shown in FIG. 5, more effective control can be exercised than the case when the correction is carried out by detecting the excitation current.

Also, it is proved that, when using this embodiment, both the DC magnetization due to the DC component included in the output of self-commutated converter 3 and the DC magnetization due to the transient DC component included in power system 1 can be effectively corrected.

In the embodiments shown in FIGS. 3 and 5, maximum value detection circuit 13 and minimum value detection circuit 14 detect the maximum and the minimum values from the inputted values at every fundamental period of power system 1. This invention is not limited to these embodiments. The maximum and the minimum values may be detected from the inputted values once for a plurality of fundamental periods of power system 1.

Furthermore, a center value is computed in arithmetic circuit 15, and correction of the instruction value of control circuit 7 is executed by the center value. Instead of the strict center value, a magnetic flux relating value calculated from the magnetic flux or the exciting current in transformer 2 may be used for the correction of the instruction value from control circuit, if DC magnetization of transformer 2 can be judged based on such a magnetic flux relating value.

In a power converter composed of self-turn-off devices which is connected to an outer system, such as a power system or a load, via a transformer, according to this invention, both the DC magnetization due to the DC component included in the power converter and the DC magnetization due to the transient DC component included in the outer system can be corrected by finding a magnetic flux relating value of the core of the transformer such as the difference between the primary winding current and the secondary winding current of the transformer, DC component included in that difference, and a magnetic flux itself, and correcting the output voltage instruction value of the power converter based on the magnetic flux relating value.

Obviously, numerous modifications and variations of the present invention are possible in light of the above teachings. It is therefore to be understood that within the scope of the appended claims, the invention may be practiced otherwise than as specifically described herein.

What is claimed is:

1. A control system for a power converter which is composed of a plurality of self-turn-off devices and is connected to an outer system through a transformer provided with a core, comprising:

output voltage instruction value generating means for generating an instruction value for an output voltage of said power converter;

detection means for detecting a magnetic flux relating value of said core of said transformer;

corrected instruction value generating means connected to receive said instruction value and said magnetic flux relating value for generating a corrected instruction value for said output voltage of said power converter to correct said instruction value; and gate pulse generating means for generating a gate pulse based on said corrected instruction value, said gate pulse being applied to said self-turn-off devices of said power converter to control said output voltage of said power converter;

whereby to suppress DC magnetization of said transformer even for DC component generated by said outer system.

2. The control system for a power converter according to claim 1, wherein said detection means includes:

magnetic flux detecting means for detecting a magnetic flux of said core of said transformer;

maximum value detecting means connected to receive said magnetic flux for detecting a maximum value of said magnetic flux during a predetermined time:

minimum value detecting means connected to receive said magnetic flux for detecting a minimum value of said magnetic flux during said predetermined time; and center value calculating means for calculating a center value from said maximum value and said minimum value during said predetermined time to output said center value as said magnetic flux relating value.

3. The control system for a power converter according to claim 2:

wherein said detection means further includes a phase detector for detecting a fundamental period of said outer system; and wherein in said detection means, said magnetic flux detecting means includes a Hall element provided in said transformer for detecting said magnetic flux of said core of said transformer, said maximum value detecting means includes a maximum value detection circuit connected to receive said magnetic flux and said fundamental period as said predetermined time for detecting said maximum value of said magnetic flux during said fundamental period, said minimum value detecting means includes a minimum value detection circuit connected to receive said magnetic flux and said fundamental period as said predetermined time for detecting said minimum value of said magnetic flux during said fundamental period; and said center value calculating means includes an arithmetic circuit for calculating said center value from said maximum value and said minimum value during said fundamental period to output said center value as said magnetic flux relating value; and wherein, said corrected instruction value generating means includes an adder for adding said instruction value and said magnetic flux relating value to generate said corrected instruction value.

4. The control system for a power converter according to claim 1: wherein said detection means includes:

current difference detecting means for detecting a current difference between a primary winding current and a secondary winding current of said transformer;

maximum value detecting means connected to receive said current difference for detecting a maximum value of said current difference during a predetermined time;

minimum value detecting means connected to receive said current difference for detecting a minimum value of said current difference during said predetermined time; and center value calculating means for calculating a center value from said maximum value and said minimum value during said predetermined time to output said center value as said magnetic flux relating value.

5. The control system for a power converter according to claim 4:

wherein said detection means further includes a phase detector for detecting a fundamental period of said outer system; and wherein in said detection means, said current difference detecting means includes, a primary current detector for detecting said primary winding current of said transformer, a secondary current detector for detecting said secondary winding current of said transformer, and a subtractor for computing said current difference between said primary winding current and said secondary winding current, said maximum value detecting means includes a maximum value detection circuit connected to receive said current difference and said fundamental period as said predetermined time for detecting said maximum value of said current difference during said fundamental period, said minimum value detecting means includes a minimum value detection circuit connected to receive said current difference and said fundamental period as said predetermined time for detecting said minimum value of said current difference during said fundamental period, and said center value calculating means includes an arithmetic circuit for calculating said center value from said maximum value and said minimum value during said fundamental period to output said center value as said magnetic flux relating value, and wherein, said corrected instruction value generating means includes an adder for adding said instruction value and said magnetic flux relating value to generate said corrected instruction value.

6. The control system for a power converter according to claim 1, wherein said detection means includes:

current difference detecting means for detecting a current difference between a primary winding current and a secondary winding current of said transformer; and DC component detecting means for detecting DC component included in said current difference to output said DC component as said magnetic flux relating value.

7. The control system for a power converter according to claim 6, wherein said current difference detecting means includes:
a primary current detector for detecting said primary winding current of said transformer;
a secondary current detector for detecting said secondary winding current of said transformer; and
a subtractor for computing said current difference between said primary winding current and said secondary winding current.

8. The control system for a power converter according to claim 6:
wherein the winding ratio of said transformer is 1:n where n is an integer greater than 0; and
wherein said current difference detecting means includes,
a primary current detector for detecting said primary winding current of said transformer,
a secondary current detector for detecting said secondary winding current of said transformer,
a multiplier for multiplying said secondary winding current by n to generate a multiplied secondary winding current, and
a subtractor for computing a difference between said primary winding current and said multiplied secondary winding current to output said difference as said current difference.

9. The control system for a power converter according to claim 6:
wherein said power converter is a three-phase power converter, and said transformer is composed of a star-delta connection; and
wherein said current difference detecting means includes,
primary current detecting means for detecting said primary winding current of said transformer;
secondary current detecting means for detecting said secondary winding current of said transformer;
star-delta conversion means for converting said primary winding current into converted primary winding current; and
subtractor means for computing s difference between said converted primary winding current and said secondary winding current to output said difference as said current difference.

10. The control system for a power converter according to claim 1:
wherein said outer system includes one of a power system and a load.

* * * * *